(12) United States Patent
Ihns

(10) Patent No.: US 10,267,889 B1
(45) Date of Patent: Apr. 23, 2019

(54) LASER SOURCE LOCATION SYSTEM

(71) Applicant: Jurgen R. Ihns, Gulf Breeze, FL (US)

(72) Inventor: Jurgen R. Ihns, Gulf Breeze, FL (US)

(73) Assignee: Avalex Technologies Corporation, Gulf Breeze, FL (US)

( * ) Notice: Subject to any disclaimer, the term of this patent is extended or adjusted under 35 U.S.C. 154(b) by 0 days.

(21) Appl. No.: 15/814,016

(22) Filed: Nov. 15, 2017

(51) Int. Cl.
| | |
|---|---|
| G06F 3/042 | (2006.01) |
| G01B 11/28 | (2006.01) |
| G01S 3/785 | (2006.01) |
| G01S 3/783 | (2006.01) |
| G01S 3/781 | (2006.01) |

(52) U.S. Cl.
CPC .............. *G01S 3/785* (2013.01); *G01S 3/781* (2013.01); *G01S 3/7835* (2013.01)

(58) Field of Classification Search
CPC ........ G01S 3/7835; G01S 3/784; G01S 3/782; G01S 7/4804; G01S 3/785; G01S 3/781; G01J 1/04; G01J 1/0437; G01J 1/4228; G01J 1/4257; G06K 9/00651; G06K 9/00476; G06T 7/004; G06T 7/20; G06T 7/60
See application file for complete search history.

(56) References Cited

U.S. PATENT DOCUMENTS

| | | | |
|---|---|---|---|
| 3,506,327 A | 4/1970 | Leith et al. | |
| 4,315,690 A | 2/1982 | Trocellier et al. | |
| 4,325,633 A | 4/1982 | Gardner | |
| 4,857,721 A | 8/1989 | Dunavan et al. | |
| 4,868,378 A | 9/1989 | Biverot | |
| 4,896,962 A * | 1/1990 | Menn | F41G 3/225 250/203.3 |
| 4,946,277 A | 8/1990 | Marquet et al. | |
| 4,954,837 A * | 9/1990 | Baird | G01C 21/005 342/458 |
| 5,280,167 A | 1/1994 | Dubois | |
| 5,428,215 A * | 6/1995 | Dubois | G01J 1/04 250/206.2 |
| 5,440,116 A | 8/1995 | Bolander et al. | |
| 5,604,695 A | 2/1997 | Cantin et al. | |

(Continued)

FOREIGN PATENT DOCUMENTS

WO 2014/203243 A1 12/2014

OTHER PUBLICATIONS

Excelitas Technologies: "Datasheet: HARLID-362 High Angular Resolution Laser Irradiance Detector" Apr. 20, 2012.

*Primary Examiner* — Sang H Nguyen
(74) *Attorney, Agent, or Firm* — Bryan W. Bockhop; Bockhop Intellectual Property Law, LLC

(57) ABSTRACT

A system for detecting a direction of a source of a laser beam includes a pixelated sensor that is sensitive to the laser beam. A mask is disposed between the source of a laser beam and the pixelated sensor. The mask includes an opaque portion that is opaque to the laser beam and a window portion that is at least translucent to the laser beam. When the laser impinges upon the mask an image of the window portion is projected onto the pixelated sensor. A processor determines an angle of incidence of the laser beam with respect to the mask by determining a number of pixels that the image of the window is offset from where the image of the window would be if the laser beam had been normal to the mask.

19 Claims, 4 Drawing Sheets

(56) References Cited

U.S. PATENT DOCUMENTS

| | | | | |
|---|---|---|---|---|
| 5,894,323 | A * | 4/1999 | Kain | G01C 11/02 |
| | | | | 348/116 |
| 6,417,839 | B1 * | 7/2002 | Odell | G01C 15/002 |
| | | | | 345/157 |
| 7,196,301 | B2 | 3/2007 | Thomas et al. | |
| 8,154,534 | B2 * | 4/2012 | Steer | G01S 3/782 |
| | | | | 345/102 |
| 8,878,114 | B2 | 11/2014 | Zollars et al. | |
| 8,907,261 | B1 * | 12/2014 | Wishstar | G01J 1/0437 |
| | | | | 250/206.2 |
| 9,489,575 | B1 * | 11/2016 | Whalen | G01S 13/94 |
| 9,841,592 | B2 * | 12/2017 | Reed | G02B 21/365 |
| 2004/0162654 | A1 * | 8/2004 | Lu | B60G 17/0162 |
| | | | | 701/38 |
| 2008/0002192 | A1 | 1/2008 | David | |
| 2008/0121826 | A1 | 5/2008 | Manley et al. | |
| 2010/0129541 | A1 * | 5/2010 | Schneider | A63C 19/06 |
| | | | | 427/137 |
| 2017/0116487 | A1 * | 4/2017 | Yamazaki | G06K 9/00805 |
| 2017/0276487 | A1 * | 9/2017 | Wang | G01C 21/206 |

\* cited by examiner

LASER SOURCE LOCATION SYSTEM

BACKGROUND OF THE INVENTION

1. Field of the Invention

The present invention relates to avionics systems and, more specifically, to an avionics system for detecting the source of a laser beam.

2. Description of the Related Art

Since the introduction of the laser pointer, incidents in which laser light has been directed toward aircraft during critical flight events (e.g., landing and takeoff) have increased substantially. Such incidents can impact flight safety as laser light aimed at the cockpit can cause the pilot to be distracted and can even cause temporary flash blindness in the pilot. Laser aircraft strike incidents can be of concern to all types of aviation, including: personal, commercial, law enforcement and military.

Determining the location of a source of a laser strike is important in neutralizing laser strikes and preventing future laser strikes. However, in reporting the source of most laser strikes, the individuals making the reports estimate the location of the source based on a momentary perception of the laser beam. This estimation is usually made while the aircraft is travelling at a high speed after the laser beam is noticed by the pilot. As a result, laser beam source location reports tend to be imprecise.

Existing detectors for determining laser beam angle of incidence tend to be expensive and usually determine angle of incidence with respect to a single axis. Because of this, a sensor system capable of locating a laser beam source in three dimensional space can be quite costly.

Therefore, there is a need for a system for detecting a source location of a laser beam.

There is also a need for an inexpensive laser beam angle of incidence detector that determines angle of incidence along two orthogonal axes.

SUMMARY OF THE INVENTION

The disadvantages of the prior art are overcome by the present invention which, in one aspect, is a system for detecting a direction of a source of a laser beam, which includes a pixelated sensor that is sensitive to the laser beam. A mask is disposed between the source of a laser beam and the pixelated sensor. The mask includes an opaque portion that is opaque to the laser beam and a window portion that is at least translucent to the laser beam. When the laser impinges upon the mask an image of the window portion is projected onto the pixelated sensor. A processor determines an angle of incidence of the laser beam with respect to the mask by determining a number of pixels that the image of the window is offset from where the image of the window would be if the laser beam had been normal to the mask.

In another aspect, the invention is an avionics device for locating a source of a laser beam emanating from a source position and aimed at an aircraft. A laser sensor detects a direction from which the laser beam is sourced relative to a known point on the aircraft and generates a laser angle signal representative thereof. A position sensor generates a position signal indicative of the aircraft's position in three dimensions relative to a predetermined frame of reference. An attitude sensor generates an attitude signal indicative of the aircraft's pitch, bank and yaw relative to the predetermined coordinate system. A processor is responsive to the laser sensor, the position sensor and the attitude sensor. The processor determines a source direction of the laser beam relative to the known point based on current values of the laser angle signal, the position signal and the attitude signal.

In yet another aspect, the invention is a method of locating a source of a laser beam, in which a location of a first edge of a projection of a shape through a window in a mask that is illuminated by the laser beam is detected by a sensor that is sensitive to the laser beam. A lateral distance from the first edge to where the edge would have been if the laser beam had been normal to the mask is calculated. A trigonometric relationship is used to calculate a laser beam source angle from the mask to the laser beam based on the lateral distance and a vertical distance between the sensor and the mask.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

DETAILED DESCRIPTION OF THE INVENTION

Figure 1:
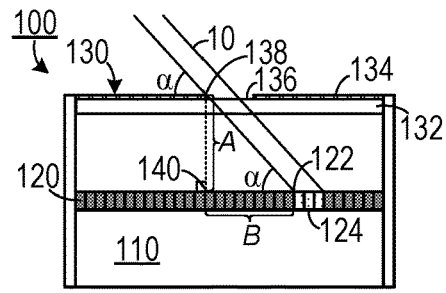
FIG. 1 is a elevational view of a representative embodiment of a laser source direction sensor system.

A preferred embodiment of the invention is now described in detail. Referring to the drawings, like numbers indicate like parts throughout the views. Unless otherwise specifically indicated in the disclosure that follows, the drawings are not necessarily drawn to scale. As used in the description herein and throughout the claims, the following terms take the meanings explicitly associated herein, unless the context clearly dictates otherwise: the meaning of "a," "an," and "the" includes plural reference, the meaning of "in" includes "in" and "on."

As shown in FIG. 1, one embodiment of a system 100 for detecting a direction of a source of a laser beam 10 includes a pixelated sensor 120 that is sensitive to the laser beam 10. The pixelated sensor 120 could include an optical video sensor array (such as a CMOS video sensor array or an array employing one of the many other laser light sensing technologies known to the art, including, e.g., InGaAs, HgCdTe, Vox, InSb) mounted on a substrate 110. However, any optical sensor array technology having sufficient resolution for the specific application and being sensitive to the laser beam could be used.

A mask plate 130 is disposed between the source of a laser beam 10 and the pixelated sensor 120. The mask plate 130 could include a layer 132 of a material that is transparent or at least translucent to the laser beam 10, such as glass or quartz, and a mask 134 that is opaque to the laser beam 10. The mask 134 defines a window portion 136, having a first edge 138. When the laser 10 impinges upon the mask 134 an image 124 of the window portion 136 is projected onto the pixelated sensor 120. In one embodiment, layer 132 is coated with an opaque coating, such as a metallized film on one side to form the mask 134. In one embodiment, the coating that is deposited on layer 132 and the window portion 136 is removed with a process such as etching, laser ablation, etc. In another embodiment, the mask 134 is printed onto layer 132, e.g., by screen printing.

The mask plate 130 is at a known distance A from pixelated sensor 120 and the edge 122 of the image 124 corresponding to the first edge 138 is at a distance B from the position of where it would have been if the laser beam 10 had been normal to the mask 134 (at position 140). The distance B can be determined by counting the number of pixels between position 140 and edge 122. Based on the foreknowledge of distance A and the measured distance B, the angle of incidence α can be determined by calculating the inverse tangent of A/B. (As will be clear to those of skill in the art, many other trigonometric relationships may be used to calculate the angle of incidence.) Typically, this calculation would be performed by a processor that is responsive to the pixelated sensor 120.

Figure 2A:
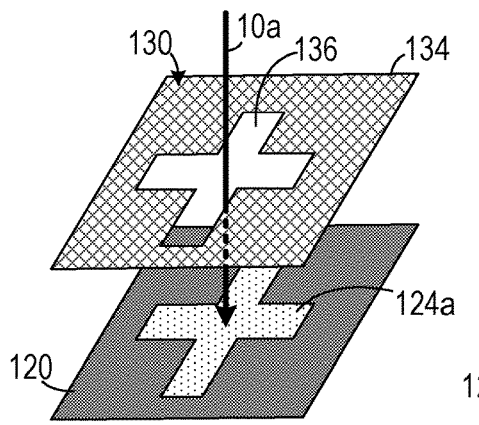
FIG. 2A is a schematic diagram showing projection of an image of a window defined by a mask onto a pixelated laser sensor in which the laser is normal to the mask.
Figure 2B:
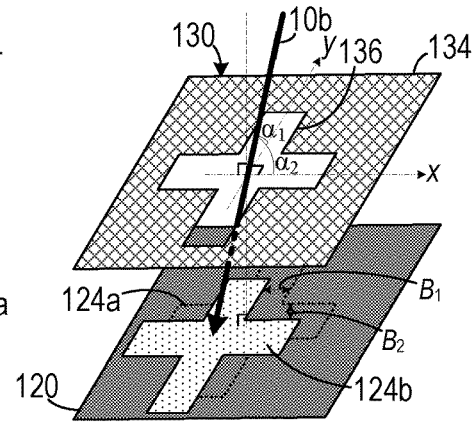
FIG. 2B is a schematic diagram showing projection of an image of a window defined by a mask onto a pixelated laser sensor in which the laser is not normal to the mask.

As shown in FIGS. 2A-2B, the mask plate 130 can define a two-dimensional shaped window portion 136 that defines a first edge and a second edge that is transverse (perpendicular in one embodiment) to the first edge to allow determination of angle of incidence along two orthogonal axes, x and y. FIG. 2A shows the image of the window portion 136 projected onto the pixelated sensor 120 when the laser beam 10a is normal to the mask plate 130, resulting in the baseline image 124a. FIG. 2B shows the image of the window portion 136 projected onto the pixelated sensor 120 when the laser beam 10b is at an angle to the mask plate 130, resulting in the image 124b being offset from the location of the base line image 124a at a distance of $B_1$ along the x axis and $B_2$ along they axis. The distances $B_1$ and $B_2$ are then used to determine the angle of incidence $\alpha_1$ along the x axis and $\alpha_2$ along the y axis.

The angle of incidence along a first axis (α1) can be calculated based on a distance (A1) from the first edge to the pixelated sensor and a distance (B1) between an image of the first edge projected by the laser beam onto the pixelated sensor and where the image of the first edge would have been had the laser beam been normal to the mask, according to the following formula:

$$\alpha_1 = \tan^{-1}\left(\frac{A_1}{B_1}\right)$$

and the angle of incidence along a second axis (α2) can be calculated based on a distance (A2) from the second edge to the pixelated sensor and a distance (B2) between an image of the second edge projected by the laser beam onto the pixelated sensor and where the image of the second edge would have been had the laser beam been normal to the mask, according to the following formula:

$$\alpha_2 = \tan^{-1}\left(\frac{A_2}{B_2}\right)$$

In one embodiment, each pixel of the pixelated sensor can be mapped to a look-up table which stores the angle of incidence associated with each pixel if it is on the edge of the image.

Figure 3:
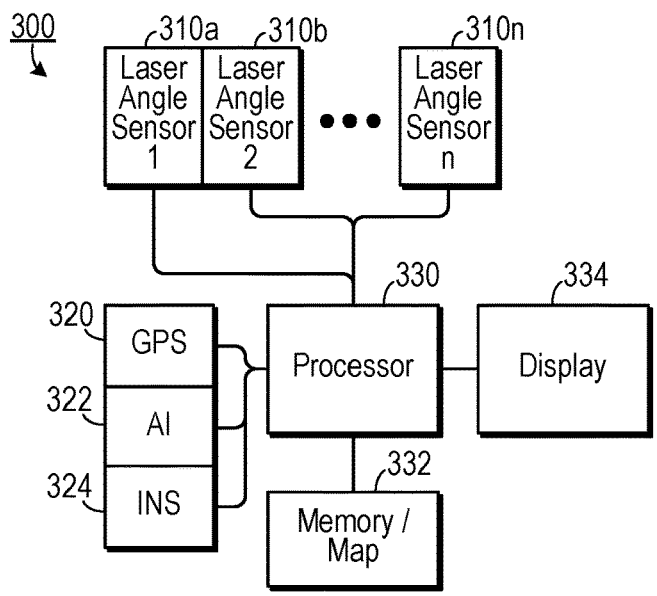
FIG. 3 is a block diagram of a representative embodiment of a laser source locating system.

One embodiment for a multi-sensor laser source locator system 300 is shown in FIG. 3, which includes a processor 330 that is in data communication with a plurality of laser beam angle of incidence sensors 310a-310n (which could be of the type described above in reference to FIGS. 1 and 2A-2B, or could a sensor of another type with similar functionality). The processor 330 could also be responsive to position data from a global positioning system (GPS) sensor 320, and attitude indicator (AI) 322 and an inertial navigation system (INS) 324. The processor 330 would have access to a computer-readable memory 332 on which is stored a digital map of the area of the system 300. In one embodiment, the map could include topographic information. Based on the angle of incidence information received from the laser beam angle of incidence sensors 310a-310n, and knowledge of the system's location, altitude and attitude, the processor can calculate a source point of origination of the laser beam and display information about the source on a display 334. In one embodiment, the system does not display a map, but simply indicates an azimuth and an elevation of the laser source relative to the sensor. The system can also issue a warning (such as an audible warning) to indicate to the crew that the aircraft should turn away. In one embodiment, the warning could also include a direction to which the aircraft should turn to maximize threat avoidance.

Figure 4:
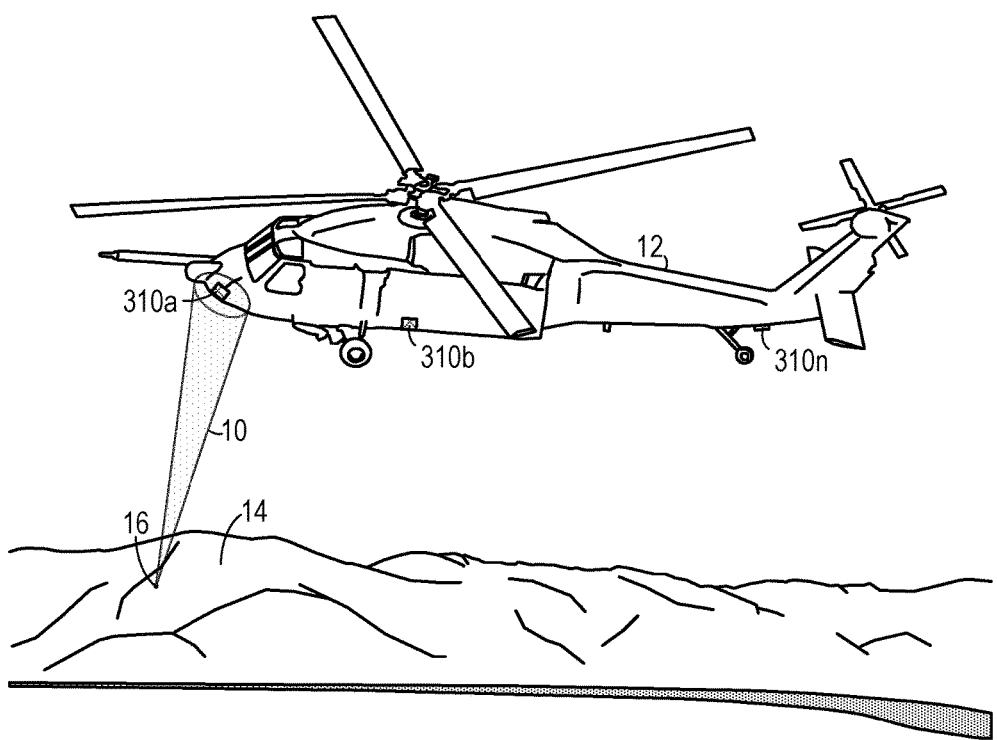
FIG. 4 is a schematic diagram of an aircraft employing the system shown in FIG. 3.
Figure 5:
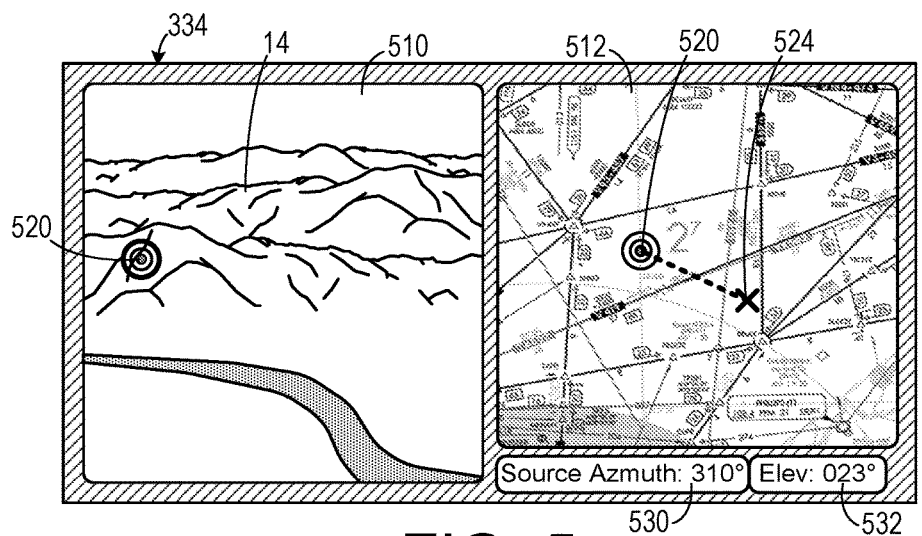
FIG. 5 is a schematic diagram of a display showing the source of a laser beam.

As shown in FIG. 4, a laser locator system can be installed on an aircraft 12, with laser beam angle of incidence sensors 310a-310n being distributed at different places on the aircraft 12. The aircraft 12 will include a position sensor, such as a GPS sensor, that generates a position signal indicative of the aircraft's position in a three dimensional coordinate system relative to a predetermined frame of reference (e.g., the surface of the earth) and an attitude sensor that generates an attitude signal indicative of the aircraft's pitch, bank and yaw relative to the predetermined coordinate system. Additional information can be taken from other avionics sensors, such as the altimeter, etc. When a laser beam 10 is sensed by the sensors 310a-310n, the system will determine the source location 16 on the terrain 14 from which the laser beam 10 originated. This system could also be used to determine the source locations of airborne laser beams (such as from targeting lasers) in certain embodiments.

In one embodiment, the display 334 could show an image 510 of the terrain 14 with a source indicator 520 placed at the source of the laser beam. The display 334 could also display a navigational chart 512 showing both the current location 524 of the aircraft and the source indicator 520 placed at the source of the laser beam. Additional information, such as azimuth (bearing) information 530 and elevation information 532 of the source relative to the aircraft can also be presented on the display.

Figure 6:
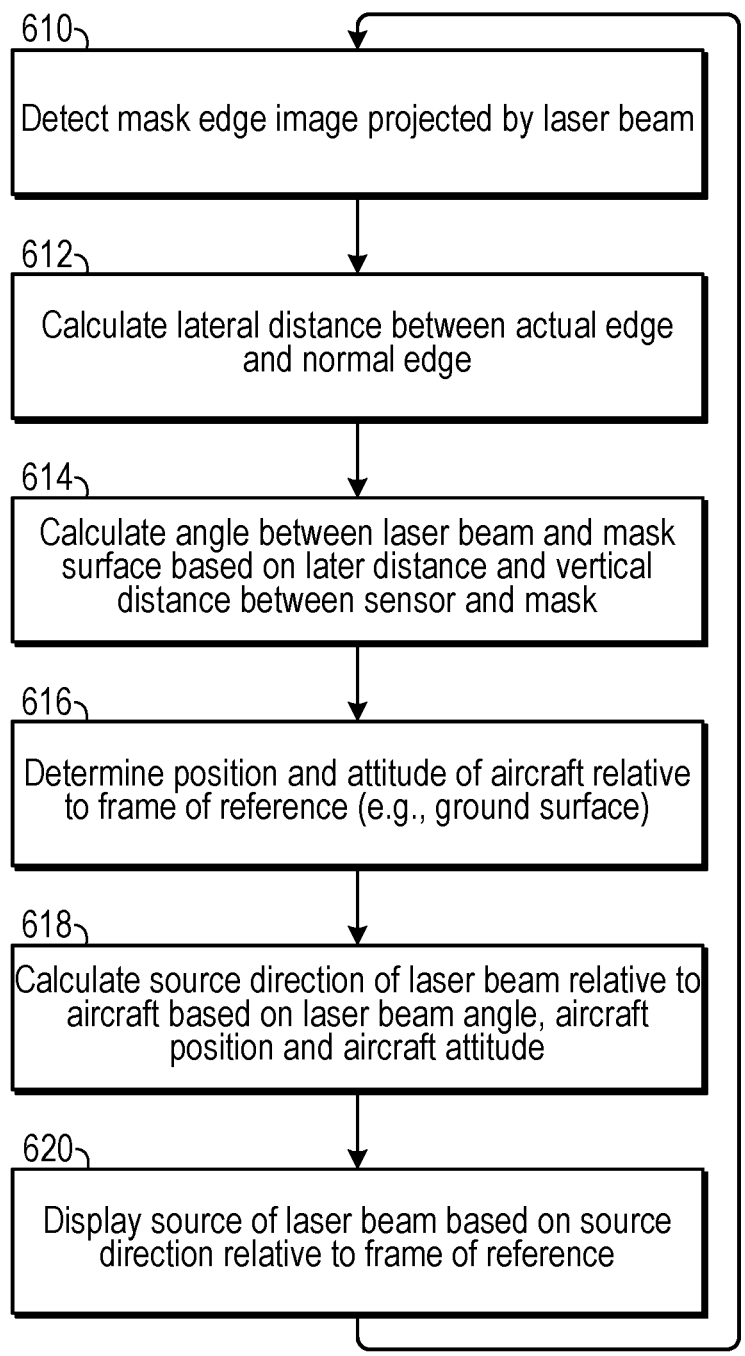
FIG. 6 is a flowchart showing one embodiment of a method for detecting the source of a laser beam.

As show in FIG. 6, in one embodiment of a method of locating a source of a laser beam, a location of a first edge of a projection of a shape through a window in a mask that is illuminated by the laser beam is detected 610. The lateral distance from the first edge to where the edge would have been if the laser beam had been normal to the mask is calculated 612. The laser beam source angle from the mask to the laser beam is calculated 614 using a trigonometric relationship based on the lateral distance and a vertical distance between the sensor and the mask. The position and attitude of aircraft relative to frame of reference (e.g., ground surface) is determined 616 using information about the laser beam source angle, the aircraft's location, altitude and attitude. The laser beam's source direction 618 from the aircraft based on the source angle, the aircraft's position and the aircraft's attitude. An indicia (such as a display) of the laser beam source direction is generated 620.

Figure 7:
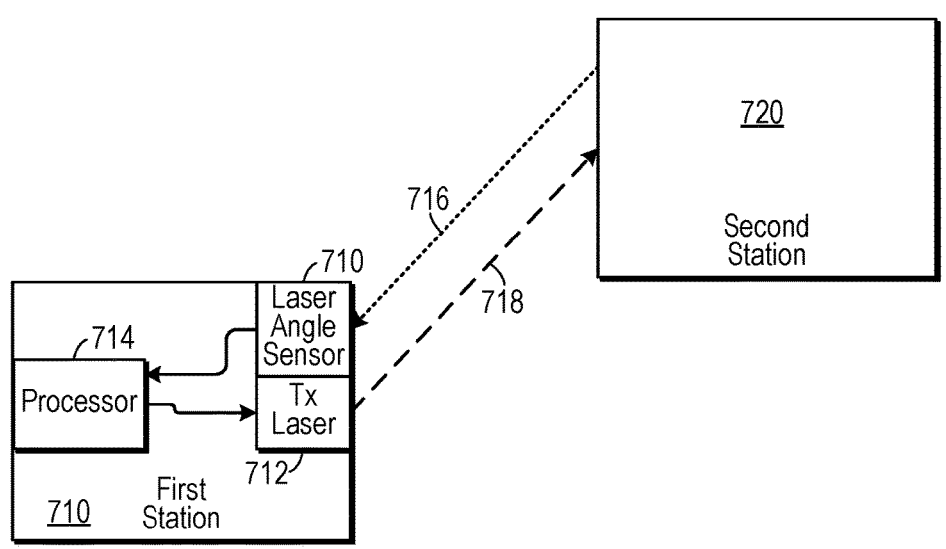
FIG. 7 is a schematic diagram of one embodiment of an optical communications system employing a laser source detection device.

As shown in FIG. 7, a laser beam source direction sensing system of the type disclosed above can be employed in a free space optics (FSO) system or an optical wireless communications (OWC) system to communicate between vehicles, including manned airborne vehicles, unmanned aircraft (UAV, UAS, UCAV, etc.) and ground vehicles. Such a system could be employed to provide feedback to a first station 710 (e.g., a vehicle) regarding the source direction of an incoming beam 716 from a second station 720. The direction can then be used to steer a transmitted beam 718 transmitted from the first station 710 to aim it more precisely at the second station 720. The system employs a laser source direction sensor 710 that provides source angle information to a processor 714. The processor 714 uses this information to aim a transmitting laser 712 at the second station to provide feedback to a first station regarding the source direction of an incoming beam from a second station and, thus, could be used to steer a beam transmitted from the first station to aim it more precisely at the second station 720.

One of the challenges for such systems is to know the arrival angle of a beam, since the host and associated vehicle have unknown angular relationships. Such arrival angle information can be employed in steering an transmitted beam. More precise beam steering will increase the signal to noise ratio (SNR) for the communications system, which will improve range, bit error rate (BER) and bandwidth of the whole system.

The above described embodiments, while including the preferred embodiment and the best mode of the invention known to the inventor at the time of filing, are given as illustrative examples only. It will be readily appreciated that many deviations may be made from the specific embodiments disclosed in this specification without departing from the spirit and scope of the invention. Accordingly, the scope of the invention is to be determined by the claims below rather than being limited to the specifically described embodiments above.

What is claimed is:

1. A system for detecting a direction of a source of a laser beam, comprising:
   (a) a pixelated sensor that is sensitive to the laser beam;
   (b) a mask, disposed between the source of a laser beam and the pixelated sensor, the mask including an opaque portion that is opaque to the laser beam and a window portion that is at least translucent to the laser beam so that when the laser impinges upon the mask an image of the window portion is projected onto the pixelated sensor; and
   (c) a processor that determines an angle of incidence of the laser beam with respect to the mask by determining a number of pixels that the image of the window is offset from where the image of the window would be if the laser beam had been normal to the mask.

2. The system of claim 1, wherein the pixelated sensor comprises a two-dimensional video sensor array that is sensitive to the laser beam and selected from a list of sensor array technologies consisting of: CMOS, InGaAs, HgCdTe, Vox and InSb.

3. The system of claim 1, wherein the mask comprises a layer of a material selected from a list consisting of: glass, quartz, sapphire, germanium, zinc selenide, and combinations thereof, on which the opaque portion is coated on one side with a coating that is opaque to the laser beam and on which the window portion is not coated with the coating.

4. The system of claim 1, wherein the window portion has a shape that includes at least a first edge and a second edge that is transverse to the first edge.

5. The system of claim 4, wherein the first edge is perpendicular to the second edge.

6. The system of claim 4, wherein the angle of incidence along a first axis ($\alpha_1$) is calculated based on a distance ($A_1$) from the first edge to the pixelated sensor and a distance ($B_1$) between an image of the first edge projected by the laser beam onto the pixelated sensor and where the image of the first edge would have been had the laser beam been normal to the mask, according to the following formula:

$$\alpha_1 = \tan^{-1}\left(\frac{A_1}{B_1}\right)$$

and wherein the angle of incidence along a second axis ($\alpha_2$) is calculated based on a distance ($A_2$) from the second edge to the pixelated sensor and a distance ($B_2$) between an image of the second edge projected by the laser beam onto the pixelated sensor and where the image of the second edge would have been had the laser beam been normal to the mask, according to the following formula:

$$\alpha_2 = \tan^{-1}\left(\frac{A_2}{B_2}\right)$$

where the second axis is perpendicular to the first axis.

7. The system of claim 1, employed in a first station that is configured to steer an outgoing laser beam toward an incoming laser beam from a second station.

8. An avionics device for locating a source of a laser beam emanating from a source position and aimed at an aircraft, comprising:
   (a) a laser sensor that detects a direction from which the laser beam is sourced relative to a known point on the aircraft and that generates a laser angle signal representative thereof;
   (b) a position sensor that generates a position signal indicative of the aircraft's position in three dimensions relative to a coordinate system of a predetermined frame of reference; and
   (c) an attitude sensor that generates an attitude signal indicative of the aircraft's pitch, bank and yaw relative to the predetermined coordinate system; and
   (d) a processor that is responsive to the laser sensor, the position sensor and the attitude sensor, that determines a source direction of the laser beam relative to the known point based on current values of the laser angle signal, the position signal and the attitude signal;
   wherein the laser sensor comprises a pixelated sensor that is sensitive to the laser beam; a mask, disposed between the source of a laser beam and the pixelated sensor, the mask including an opaque portion that is opaque to the laser beam and a window portion that is at least translucent to the laser beam so that when the laser impinges upon the mask an image of the window portion is projected onto the pixelated sensor; and the processor that determines an angle of incidence of the laser beam with respect to the mask by determining a number of pixels that the image of the window is offset from where the image of the window would be if the laser beam had been normal to the mask.

9. The avionics device of claim 8, further comprising a memory in data communication with the processor that stores a digital map of a ground surface upon which the source position is located, wherein the processor is further configured to locate the source position on the map and to generate an indication of where the source position is on the map.

10. The avionics device of claim 8, further comprising a display upon which is displayed an image of a relevant portion of a ground surface and wherein the processor is further configured to display a graphical indication of the location of the source position on the image of a relevant portion of the ground surface.

11. The avionics device of claim 8, wherein the pixelated sensor comprises a two-dimensional CMOS video sensor array that is sensitive to the laser beam.

12. The avionics device of claim 8, wherein the mask comprises a layer of material selected from a list consisting of: glass, quartz, sapphire, germanium, zinc selenide, and combinations thereof, on which the opaque portion is coated on one side with a coating that is opaque to the laser beam and on which the window portion is not coated with the coating.

13. The avionics device of claim 8, wherein the window portion has a shape that includes at least a first edge and a second edge that is transverse to the first edge.

14. The avionics device of claim 13, wherein the first edge is perpendicular to the second edge.

15. The avionics device of claim 13, wherein the angle of incidence along a first axis ($\alpha_1$) is calculated based on a distance ($A_1$) from the first edge to the pixelated sensor and a distance ($B_1$) between an image of the first edge projected by the laser beam onto the pixelated sensor and where the image of the first edge would have been had the laser beam been normal to the mask, according to the following formula:

$$\alpha_1 = \tan^{-1}\left(\frac{A_1}{B_1}\right)$$

and wherein the angle of incidence along a second axis ($\alpha_2$) is calculated based on a distance ($A_2$) from the second edge to the pixelated sensor and a distance ($B_2$) between an image of the second edge projected by the laser beam onto the pixelated sensor and where the image of the second edge would have been had the laser beam been normal to the mask, according to the following formula:

$$\alpha_2 = \tan^{-1}\left(\frac{A_2}{B_2}\right)$$

where the second axis is perpendicular to the first axis.

16. A system for detecting a direction of a source of a laser beam, comprising:
(a) a pixelated sensor that is sensitive to the laser beam;
(b) a mask, disposed between the source of a laser beam and the pixelated sensor, the mask including an opaque portion that is opaque to the laser beam and a window portion that is at least translucent to the laser beam so that when the laser impinges upon the mask an image of the window portion is projected onto the pixelated sensor, the window portion having a shape that includes at least a first edge and a second edge that is transverse to the first edge; and
(c) a processor that determines an angle of incidence of the laser beam with respect to the mask by determining a number of pixels that the image of the window is offset from where the image of the window would be if the laser beam had been normal to the mask,
wherein the angle of incidence along a first axis ($\alpha_1$) is calculated based on a distance ($A_1$) from the first edge to the pixelated sensor and a distance ($B_1$) between an image of the first edge projected by the laser beam onto the pixelated sensor and where the image of the first edge would have been had the laser beam been normal to the mask, according to the following formula:

$$\alpha_1 = \tan^{-1}\left(\frac{A_1}{B_1}\right)$$

and wherein the angle of incidence along a second axis ($\alpha_2$) is calculated based on a distance ($A_2$) from the second edge to the pixelated sensor and a distance ($B_2$) between an image of the second edge projected by the laser beam onto the pixelated sensor and where the image of the second edge would have been had the laser beam been normal to the mask, according to the following formula:

$$\alpha_2 = \tan^{-1}\left(\frac{A_2}{B_2}\right)$$

where the second axis is perpendicular to the first axis.

17. The system of claim 16, wherein the pixelated sensor comprises a two-dimensional video sensor array that is sensitive to the laser beam and selected from a list of sensor array technologies consisting of: CMOS, InGaAs, HgCdTe, Vox and InSb.

18. The system of claim 16, wherein the mask comprises a layer of a material selected from a list consisting of: glass, quartz, sapphire, germanium, zinc selenide, and combinations thereof, on which the opaque portion is coated on one side with a coating that is opaque to the laser beam and on which the window portion is not coated with the coating.

19. The system of claim 16, wherein the first edge is perpendicular to the second edge.

* * * * *